United States Patent [19]
Hilgemann

[11] 3,873,022
[45] Mar. 25, 1975

[54] REGULATING STATION

[75] Inventor: Hans Hilgemann, Recklinghausen, Germany

[73] Assignee: Tour Agenturer Aktiebolag, Johanneshov, Sweden

[22] Filed: June 14, 1973

[21] Appl. No.: 369,795

[30] Foreign Application Priority Data
June 14, 1972 Germany............................ 2228918

[52] U.S. Cl..................... 237/8 R, 165/11, 237/8 C, 237/63
[51] Int. Cl.............................................. F24d 3/02
[58] Field of Search............ 165/11, 33, 36; 237/63, 237/62, 59, 8 R, 8 C; 126/362; 236/9 A

[56] References Cited
UNITED STATES PATENTS

| | | | |
|---|---|---|---|
| 2,048,602 | 7/1936 | Evans................................. | 237/8 R |
| 2,246,138 | 6/1941 | Lum.................... | 237/8 R |
| 2,781,174 | 2/1957 | Smith.................... | 237/8 C |
| 2,813,683 | 11/1957 | Dillman............................ | 237/8 R |
| 2,884,197 | 4/1959 | Whittell, Jr. ......................... | 237/8 C |
| 3,608,818 | 9/1971 | von Fellenberg..................... | 237/8 B |
| 3,782,132 | 1/1974 | Lohoff.................................. | 165/46 |

Primary Examiner—Carroll B. Dority, Jr.
Assistant Examiner—W. E. Tapolcai, Jr.
Attorney, Agent, or Firm—Armstrong, Nikaido & Wegner

[57] ABSTRACT

A regulating station for use with a heating or cooling pipe line installed in a structural element such as a wall or floor which includes a forward flow line, a return flow line, and a three-way mixing valve and regulating line for controlling the return flow admixture. The station has a by-pass line which shunts the regulating line in order to insure that the proper amount of hot or cold water is supplied to the pipe line to keep the heated or cooled area at the proper temperature.

10 Claims, 3 Drawing Figures

# REGULATING STATION

BACKGROUND OF THE INVENTION

1. Field of the Invention

The present invention relates to a regulating station comprising a feed pump, a forward flow line, a return flow line, a three-way mixing valve and a regulating line for the return flow admixture, designed for use with a pipe line to be installed in a floor, wall, or ceiling for the optional heating and cooling of a structural layer.

2. Description of the Prior Art

A regulating station of the above-mentioned type, for use with a boiler, is already known in the art. This station is designed to be rigidly incorporated in a non-removable manner in a specific system, the three-way mixing valve being designed for the entire range of regulation of, for example, 200–2,000 liters per hour. As a result, it is not only necessary to install a large and relatively expensive three-way mixing valve, but, on account of its size, it has an inaccurate and sluggish regulating characteristic in the transition periods. As a result, the pipe line for heating or cooling the floor, wall, or ceiling, cannot be charged in an exact manner with the requisite amount of water per unit of time having a specific temperature. Furthermore, with the known regulating station, there is no way of preventing a quantity of water having an excessively high temperature from shooting periodically into the pipe line and it is therefore necessary for this pipe line to be made of a heat-resistant plastic or metallic material.

SUMMARY OF THE INVENTION

The object of the present invention is to obviate the above disadvantages and to provide a regulating station of compact construction comprising only a relatively small mixing valve, which, irrespective of the type of heat producer, e.g., boiler, battery, heat exchanger, makes it possible to accurately regulate the temperature of the heating or cooling water flow over the entire range of regulation. Accordingly, the pipe line may be made of plastic material possessing only limited heat resistance, for example, polyethylene.

According to this invention, this problem is solved in that the regulating station is provided with a by-pass line arranged to shunt the regulating line in the forward flow direction of the water. In this way, the regulating line of the regulating station is effectively relieved of some of its traffic and during the heating periods exactly the right amount of forward flow hot water is tapped via the three-way mixing valve to ensure that the mixing of this hot water from the heat producer and the colder reflux water flowing from the pipe line via the regulating line and the by-pass line provides exactly the requisite amount of water at the right temperature.

The by-pass line may be governed or closed by means of a cover plate or valve to preset and regulate the station.

The feed pump is arranged after the regulating line and the by-pass line in the forward flow line to effectively mix the water flowing from the boiler forward flow of the regulating line and the by-pass line to the heating forward flow.

According to another advantageous feature of the invention, two thermostats are adapted to be screwed into place in succession after the feed pump. The first of these thermostats is set to a desired value and regulates the three-way mixing valve while the second thermostat switches off the feed pump when the critical forward flow temperature is reached. This provides a safety device capable of satisfying all requirements. Furthermore, an excessively high temperature cannot adversely affect the pipe line if this is made of plastic and in the course of the cooling process a forward flow having an excessively low temperature cannot rush into the pipe line thereby causing the air around the particular pipe line or structural layer to drop below the point of condensation whereupon the moisture contained in the air begins to condense out.

A shut-off member is arranged at each end of the regulating station to permit the entire station to be closed off in the case of an emergency or for repairs and also to permit easy installation and removal. An air eliminator provided with a venting element and an excess pressure safety valve is arranged at the front end of the forward flow line and a further venting element is arranged at the highest part of the regulating station.

According to another advantageous embodiment of the invention, a connecting line is designed to be arranged between the forward and return flow line when the station is connected behind a boiler constituting the heat producer. The connecting line is provided to raise the temperature of the colder reflux water flowing into the boiler by mixing it with warm forward flow water in feed direction after the regulating station. The connecting line is preferably provided with a small feed pump. This measure effectively prevents the temperature within the boiler from falling below the condensation point, which would otherwise cause harmful condensation water to be produced. In this case, a nonreturn valve is advantageously arranged between this connecting line and the regulating line of the three-way mixing valve. This nonreturn valve is designed to open in the return flow direction of the water flowing from the pipe line and to close in the reverse direction so that no water can be forced by the small feed pump of the connecting line into the return flow line leading from the pipe line.

A test cock for the connection of a differential pressure manometer is arranged in front of and after the feed pump, in front of and behind the by-pass valve, and in the boiler forward flow and return flow lines, to permit the regulating station to be adjusted, after it has been connected into the system, in a constant and reliable manner, to suit the structural conditions of the pipe line.

Other features, objects and advantages of the present invention will be described in the following description of a preferred embodiment of the invention, which is provided by way of example with reference to the accompanying drawings, in which:

DESCRIPTION OF THE PREFERRED EMBODIMENTS

Figure 1:
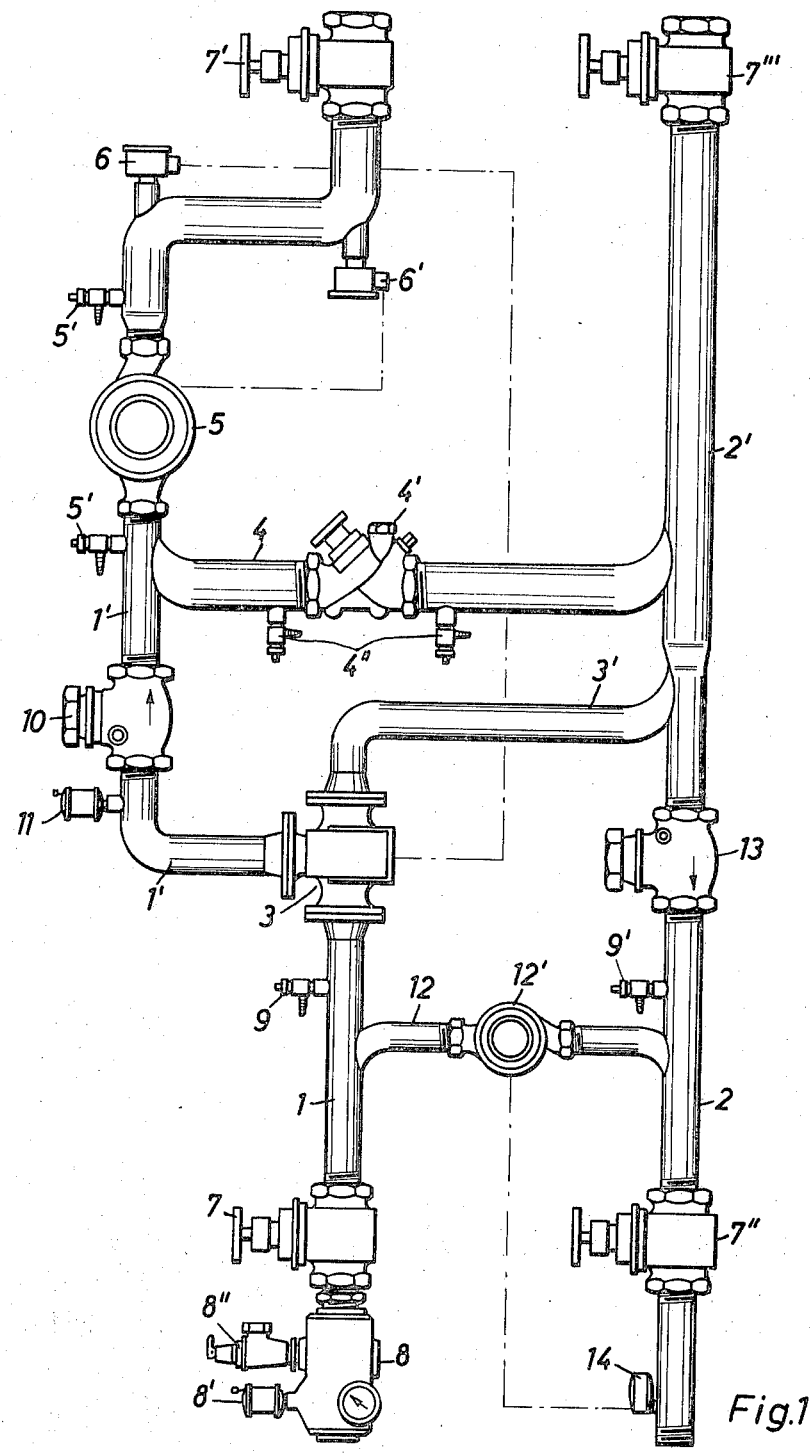
FIG. 1 is a plan view of a regulating station to be incorporated behind a boiler illustrated in a position turned about 90° in the drawing plane in counterclockwise direction to its assembled state.
Figure 2:
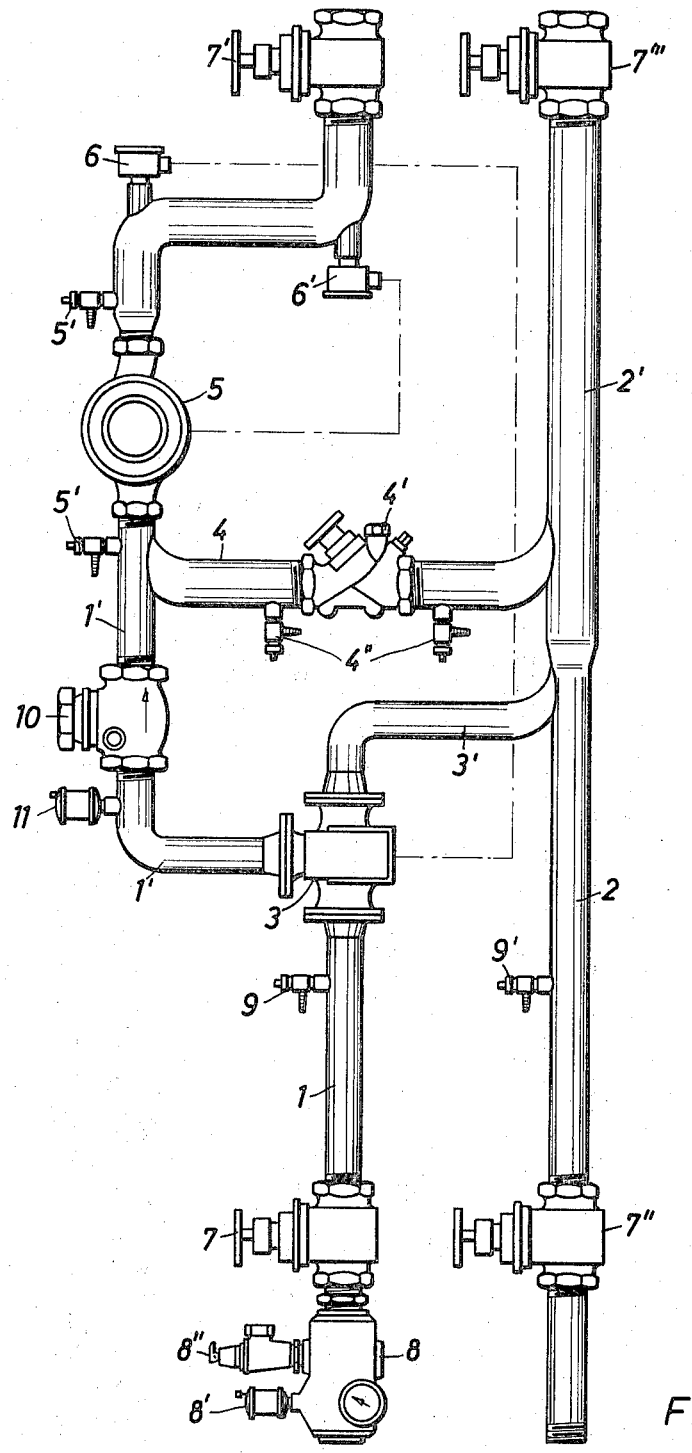
FIG. 2 shows another embodiment of a regulating station for installation behind a battery or heat exchanger, again illustrated in a position turned about 90° in the drawing plane in counterclockwise direction with respect to its assembled state.

The regulating stations shown in FIGS. 1 and 2 consist essentially of a boiler forward flow line 1, a boiler return flow line 2, a heating forward flow line 1' and a heating return flow line 2'. The three-way mixing valve 3, which is connected to the heating return flow line 2' via the regulating line 3' for the admixing of the return flow, is arranged between the boiler forward flow line 1 and the heating return flow line 2'. The by-pass line 4, which, in the embodiment represented, is provided with a slide valve 4' and two test cocks 4", is arranged in the forward flow direction of the water behind the regulating line 3'. The feed pump 5 is arranged in the heating forward flow line 1' after the by-pass line 4. A test cock 5' is provided in front of and after the feed pump 5 for the purpose of regulation. The thermostat 6 is arranged after the feed pump 5 in the counter current, and the thermostat 6' is screwed into place immediately after it in the direct current. The first thermostat 6 regulates the three-way mixing valve 3 on the basis of a desired value, which may be shifted by way of an external sensing element operating as a function of the weather. The second thermostat 6' switches off the feed pump 5 when a preregulated critical temperature of the forward flow water is reached. A shut-off member in the form of shut-off valves 7,7', 7", and 7''', is arranged at each end of the regulating station. Immediately next to the shut-off valve 7, air eliminator 8 is provided with a venting element in the form of a float vent 8' and an excess pressure safety valve 8" in the form of a diaphragm safety valve. The air eliminator is screwed onto the front end of the boiler forward flow line 1. As a rule, this air eliminator element opens at a pressure of more than 2.5 atm.

A further test cock 9, which is coordinated with the test cock 9' in the boiler return flow line 2, is arranged in front of the three-way mixing valve 3. A nonreturn valve 10 for blocking the return flow is provided in the heating forward flow line 1', and, a further venting element in the form of a float vent 11, is provided.

The two embodiments of the regulating station as represented in FIGS. 1 and 2 differ essentially in that the embodiment according to FIG. 1 is provided with a connecting line 12 between the boiler forward flow line 1 and the boiler return flow line 2. A small feed pump 12' is preferably arranged in the connecting line 12. This connecting line 12 and the feed pump 12' arranged therein are intended for the removal of warm forward flow water from the boiler forward flow line 1 and for the conduction of this warm water to the cold return flow water in the boiler return flow line 2. This measure is intended to prevent the temperature of the cold reflux water from falling below the condensation temperature of the boiler gases on the heating surfaces in the boiler thereby causing the moisture to be condensed out of the boiler gases. Combined with sulfur oxies, this condensate would tend to produce sulfur corrosion of the heating surfaces. A further nonreturn valve 13, which only opens in the direction of the flow of the water flowing back to the boiler, is arranged immediately after the connecting line 12 in the boiler return flow line 2, to prevent the hot water from the pump 12' from penetrating into the heating return flow line 2'. To save energy costs, it is advisable for the pump 12' only to be put into operation when the thermostat 14, which has been preset to a desired value, indicates that the temperature of the return flow water has fallen below this desired value.

Figure 3:
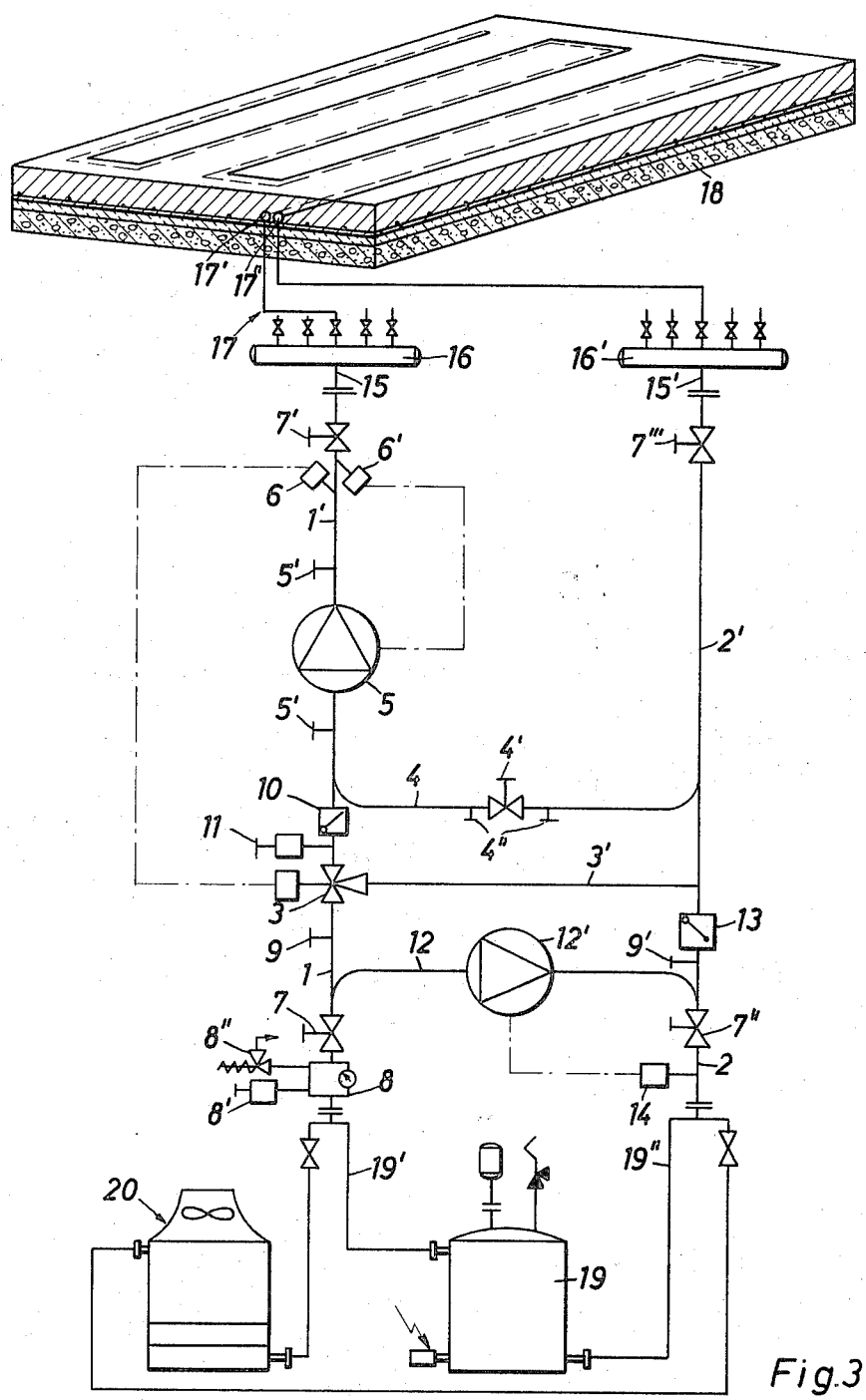
FIG. 3 is an overall circuit diagram of the regulating station according to FIG. 1 with a heating boiler and a pipe line arranged in the structural layer.

The regulating station according to FIG. 1 is represented in the form of a circuit diagram of the overall system in FIG. 3. The two shut-off valves 7' and 7''' are each screwed onto pipe lines 15 and -'. The pipe line 15 leads to a forward flow distribution device 16 and the line 15' leads to a return flow collection device 16'. A pipe line 17 is connected to the forward flow distributor 16 and to the return flow collector 16'. The forward flow channel 17' and the return flow channel 17" of this pipe line 17 are provided over their entire length with a common contact surface for direct heat exchange and, in this particular case, are arranged in the structural layer 18 of a floor.

At the other end, the regulating station is connected by a screw joint via its air eliminator 8 to the forward flow line 19' of a boiler 19 and, in the proximity of the thermostats, to the return flow 19" of the same.

This permits a refrigeration system 20 to be connected in parallel with the heating boiler 19. In the case in question, this is symbolized by a cooling tower. In this case, the regulating station can be used for a pipe line 17 designed to cool a structural layer.

To operate the pipe line 17 for heating a structural layer 18, the regulating station is adjusted as follows:

The system is adjusted in its cold state. First, the threeway mixing valve 3 is opened manually in the direction of flow from the boiler forward flow line 1 to the heating forward flow line 1'. The by-pass valve 4' is also fully opened manually. The feed pump 5 is then set in operation. A differential pressure manometer (U-pipe manometer) is then connected to each of the test cocks 9, 9' and 4", and the cocks are opened. After venting both differential pressure manometers, differential pressures are obtained in the same. These pressures will have a purely random relationship. With the three-way mixing valve 3 still fully opened, the by-pass valve 4' will slowly be closed in a steady manner, whereupon the differential pressures of both manometers will change. The regulating process is terminated when the difference between the two differential pressures, which are to be monitored constantly, reaches a specific value. This specific value is the pressure drop which is obtained from the characteristic diagram for the three-way mixing valve, when, at a specific nominal value it allows the passage of the particular amount of water required to cover the heat requirement on an extremely cold day.

The test cocks 5' behind and in front of the pump 5 are used in the case of non-regulatable pumps to bring the working range of the pump to the previously calculated working point by producing a throttling action at the by-pass valve 4' by means of a differential pressure manometer. This throttling action can obviously also be carried out at the shut-off valves 7' and 7".

While the present invention has been illustrated by a detailed description of preferred embodiments thereof, it will be obvious to those skilled in the art that various changes in form and detail can be made therein without departing from the spirit and scope of the invention.

What is claimed is:

1. A flow regulating station for a pipeline for installation in a floor, wall or ceiling, for use in heating or cooling of a structural layer, the flow regulating station comprising:

a. a forward flow line
b. a three way mixing valve having a first input connected to the forward flow line and an output connected to the forward flow line, the output of the forward flow line being connected to the pipeline;
c. a return flow line, the input of the return flow line being connected to the output of the pipeline;
d. a regulating line connected between the return flow line and a second input to the three way valve, the regulating line carrying a reflux admixture;
e. a bypass line coupled between the return flow line and the forward flow line, the bypass line being connected to the return flow line between the input of the return flow line and the regulating line and connected to the forward flow line between the output of the three way valve and the output of the forward flow line;
f. a feed pump connected in the forward flow line between the bypass line and the output of the forward flow line; and
g. first and second thermostats connected in succession in the forward flow line between the feed pump and the output of the forward flow line, the first thermostat being preset to a desired value and regulating the three way valve, and the second thermostat switching off the feed pump when the forward flow fluid reaches a critical temperature.

2. A flow regulating station according to claim 1, wherein the by-pass line may be throttled or closed by means of a valve.

3. A flow regulating station according to claim 1 further including a shut-off element provided at each end of the regulating station.

4. A flow regulating station according to claim 1 further including a nonreturn valve arranged in the forward flow line between the three-way mixing valve and the feed pump, said nonreturn valve opening in the feed direction.

5. A flow regulating station according to claim 1 further including an air eliminator provided with a venting element and an excess pressure safety valve coupled to the input of the forward flow line.

6. A flow regulating station according to claim 5 further including a second venting element provided at the regulating station.

7. A flow regulating station according to claim 2 further including first test cock means for the connection of a differential pressure manometer in front of and after the feed pump and in front of and after the bypass valve.

8. A flow regulating station according to claim 7 further including a second test cock means for the connection of a differential pressure manometer in each of the forward flow line and the return flow line.

9. A flow regulating station according to claim 1 wherein the regulating station is essentially T-shaped in form in the region of the by-pass line, one line being formed by the by-pass line and the other line being formed by the forward flow line leading to the pipe line.

10. A regulating station according to claim 9 wherein the other line is provided with two elbows leading to the return flow line.

* * * * *